(12) United States Patent
Wakamori et al.

(10) Patent No.: US 6,409,006 B1
(45) Date of Patent: Jun. 25, 2002

(54) FRICTION PLATE

(75) Inventors: Tetsuya Wakamori, Iwata; Rikiya Takahashi, Fukuroi, both of (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/585,404

(22) Filed: Jun. 2, 2000

(30) Foreign Application Priority Data

Jun. 22, 1999 (JP) .............................................. 11-175357

(51) Int. Cl.⁷ .......................... F16D 69/00; F16D 13/64
(52) U.S. Cl. ............................. 192/107 R; 192/113.36; 83/48; 83/684
(58) Field of Search ............................ 192/70.12, 70.14, 192/107 R, 113.36; 83/48, 684

(56) References Cited

U.S. PATENT DOCUMENTS

| | | | | |
|---|---|---|---|---|
| 4,260,047 A | * | 4/1981 | Nels | 192/70.14 |
| 4,449,621 A | * | 5/1984 | F'Geppert | 192/70.13 |
| 5,571,372 A | * | 11/1996 | Miyaishi et al. | 156/515 |
| 5,776,288 A | * | 7/1998 | Stefanutti et al. | 156/263 |
| 5,954,172 A | * | 9/1999 | Mori | 192/3.29 |
| 6,019,205 A | | 2/2000 | Willwerth et al. | 192/107 R |

* cited by examiner

Primary Examiner—Richard M. Lorence
(74) Attorney, Agent, or Firm—Miles & Stockbridge P.C.

(57) ABSTRACT

A friction plate comprising a substantially annular core plate and a frictional material segment disposed on the core plate and including inner and outer peripheries and a concave cut-away portion provided at at least one of corner portions joining sides of the frictional material segment to at least one of the inner and outer peripheries.

54 Claims, 6 Drawing Sheets

FRICTION PLATE

BACKGROUND OF THE INVENTION

1. Field of the Invention

This invention relates to a friction plate for use in a lock-up clutch, a brake or the like used in the automatic transmission or the like of a vehicle.

2. Related Background Art

FIG. 6 of the accompanying drawings is a front view of a friction plate 21 according to the prior art on which frictional material segments are stuck. As shown in FIG. 7 of the accompanying drawings, a long frictional material sheet 22 is fed out and punched at an equal pitch to obtain a plurality of frictional material segments 23.

As shown in FIG. 7, a radius R describing an arc 26 disposed on the inner peripheral side of the core plate 28 of the frictional-material segment 23 and a radius R describing an arc 27 disposed on the outer peripheral side of the core plate 28 are equal to each other. This shape further improves the yield of the material as compared with a case where frictional material segments of a shape along the inner and outer peripheral edges of the core plate 28 are punched.

The prior art friction plate 21 is obtained by sticking the thus obtained frictional material segments 23 on the annular core plate 28. A spline 29 to be fitted to the hub of a partner member is provided on the inner periphery of the core plate 28, and oil paths 30 for discharging lubricating oil are provided at predetermined intervals among the segments.

When the frictional material segments 23 are continuously punched by a press, the frictional material segments 23 are cut twice. Particularly, a side extending in the diametral direction and an arc on the upstream side with respect to the feeding direction are cut together, while on the other hand, an arc on the downstream side with respect to the feeding direction is already cut at one pitch. With regard to the arc portion on the downstream side, the cutting clearance is great even when a minute pitch error occurs, and the stress produced during the cutting of a frictional material sheet can be relieved by flexure. However, with regard to the corner portion, when the cutting of the side extending in the diametral direction intersecting with the upstream arc is done, a localized force is applied and thus, the stress introduced cannot be sufficiently relieved by flexure alone, and cutting refuse is produced. As the result, the powder-like cutting refuse produced by the minute error of pitch feeding accumulates in and around the metal mold of the press. Further when the press continues to be operated with this cutting refuse left as it is, there arises the inconvenience that excess stress or the like is produced to thereby accelerate the wear of the punch and dies of the metal mold or cause the breakage of the dies.

SUMMARY OF THE INVENTION

The present invention has as its object to eliminate or decrease the production of the abovementioned cutting refuse to prevent the wear and damage of the metal mold of a press for punching frictional material segments.

To achieve the above object, the friction plate of the present invention is a friction plate comprising a substantially annular core plate and a frictional material segment stuck on the core plate with the center point of the core plate as the center, wherein the frictional material segment has inner and outer peripheries comprising two arcs having the same radius, a concave cut-away portion provided at at least one of corner portions joining sides of the frictional material segment to at least one of the inner and outer peripheries.

Also, the friction plate of the present invention is characterized in that the cut-way portion preferably include at least one arc.

The friction plate of the present invention is further characterized in that the radius of the arc of the cut-away portion is at least 0.2 mm.

Also, the present invention provides a punching apparatus having a punch and a die and for punching a frictional material segment from a frictional material, wherein the frictional material segment has inner and outer peripheries comprising two arcs having the same radius, and a concave cut-away portion provided at at least one of corner portions joining sides of the frictional material segment to at least one of the inner and outer peripheries.

In the friction plate of the present invention, the frictional material to be stuck on the core plate is made into segments, and is further made into a shape in which the radii of arcs disposed on the inner and outer peripheral edge sides of the frictional material segments are the same. Further, when this shape is punched into equal pitches by a press, a cut-away portion is provided at two corner portions located in a direction in which the frictional material is fed out. This cut-away portion has the same center as the center of the arc disposed on the inner peripheral side of the core plate of the frictional material segments and is larger by an amount corresponding to the depth forming the cut-away portion than the radius forming the arc of the inner peripheral side.

The corner portion constituted by the sides forming the cut-away portion is made into an arc, and the radius forming the arc is at least 0.2 mm.

Also, each of the frictional material segments includes inner and outer peripheries comprising two arcs having the same radius and a cut-away portion is provided at at least one of corner portion joining sides of the frictional material segment to at least one of the inner and outer peripheries. The punching surface and die of the punch have a corner portion at which at least one of the inner and outer peripheries and the sides linking the opposite ends of the inner and outer peripheries together intersect with each other.

DESCRIPTION OF THE PREFERRED EMBODIMENTS

Figure 1:
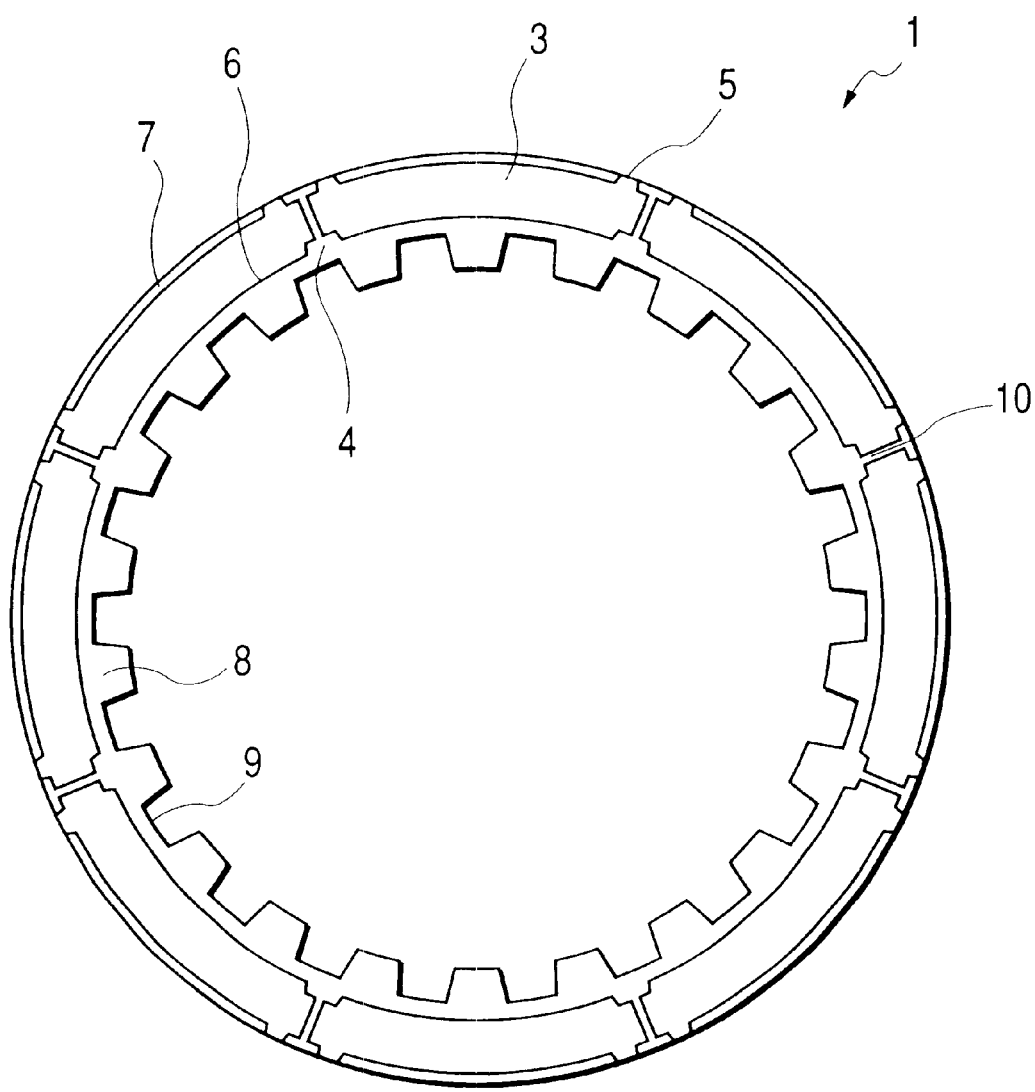
FIG. 1 is a front view of a friction plate according to an embodiment of the present invention.

Each embodiment of the present invention will hereinafter be described in detail with reference to the accompanying drawings. In the drawings, like portions are designated by like reference numerals.

FIG. 1 is a front view of a friction plate for a wet type multi-plate clutch showing an embodiment of the present invention. The friction plate 1 is provided by substantially circumferentially equally sticking a plurality of frictional material segments 3 on a substantially annular core plate 8. A spline 9 to be fitted to the hub (not shown) of a partner member is provided on the inner periphery of the core plate 8. A plurality of friction plates 1 of the wet type multi-plate clutch are axially movable through the spline 9, and are frictionally engaged with separator plates (not shown) mutually disposed to thereby transmit motive power.

Each of the frictional material segments 3 has an arcuate side 6 on the inner peripheral side of the core plate 8 and an arcuate side 7 on the outer peripheral side of the core plate 8. Cut-away portions 4 are provided at the corner portions of the circumferentially opposite ends of the side 6, and protruded portions 5 are provided on the circumferentially opposite ends of the side 7. The frictional material segments 3 are disposed at predetermined intervals, and these intervals provide oil paths 10 for discharging lubricating oil from the outer periphery to the inner periphery of the friction plate 1 or from the inner periphery to the outer periphery of the friction plate 1. In FIG. 1, eight of the same frictional material segments 3 are stuck on the core plate 8, but of course, the number of the frictional material segments 3 can be arbitrarily selected.

Figure 2:
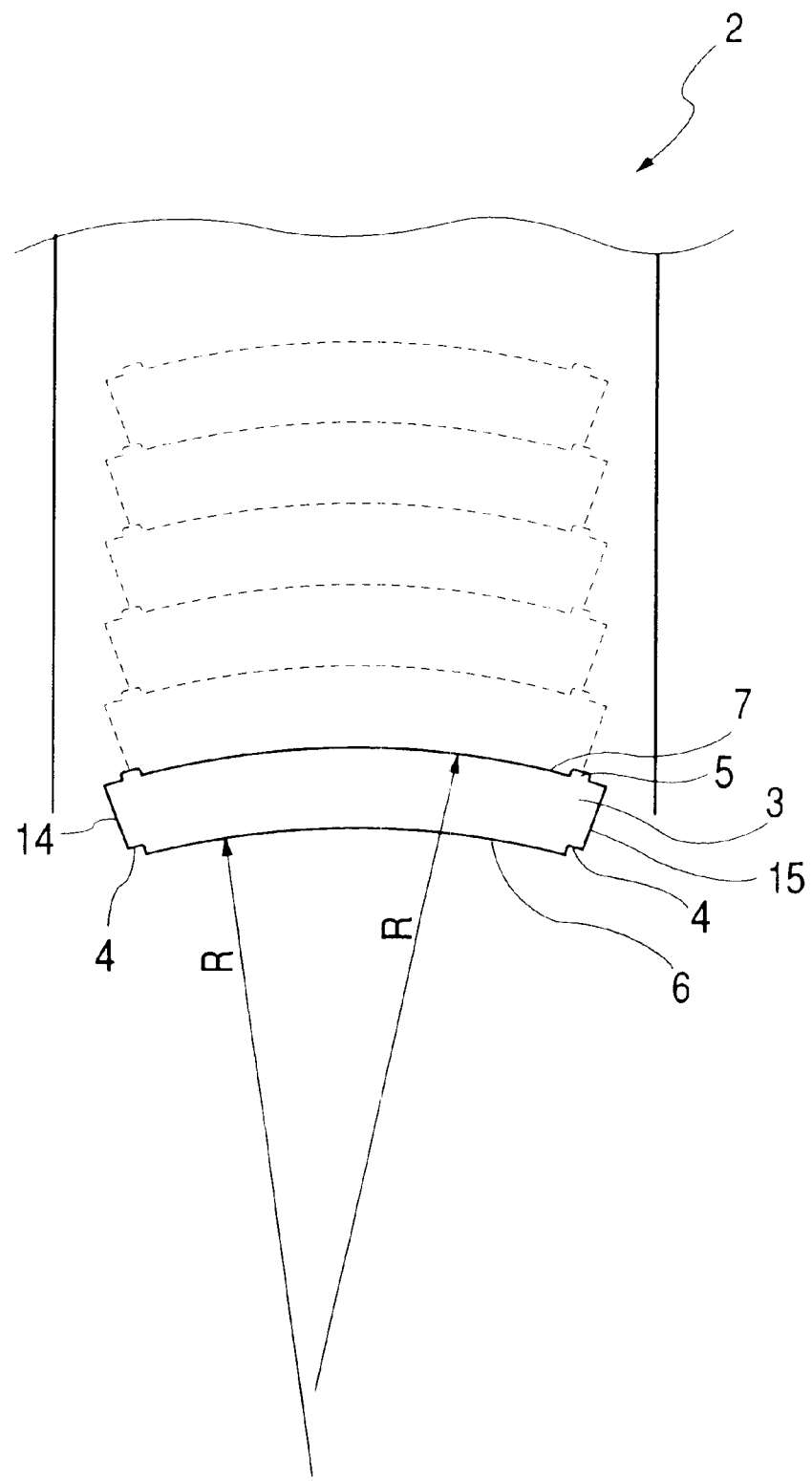
FIG. 2 shows the shape of the frictional material segments of the present invention.

FIG. 2 shows the shape of the frictional material segments 3. A frictional material, i.e., a frictional material sheet 2, is fed out at an equal pitch, and the frictional material segments 3 are successively punched. The two arcuate sides 6 and 7 each frictional material segment 3 have the same radius R. That is, the side 7 on the outer peripheral side of one frictional material segment 3 forms the side 6 on the inner peripheral side of the next frictional material segment 3 that is punched. Accordingly, there is no gap among the frictional material segments 3 successively punched, and the uncut portions of the material are only the opposite side edge portions of each frictional material segment 3.

Figure 3:
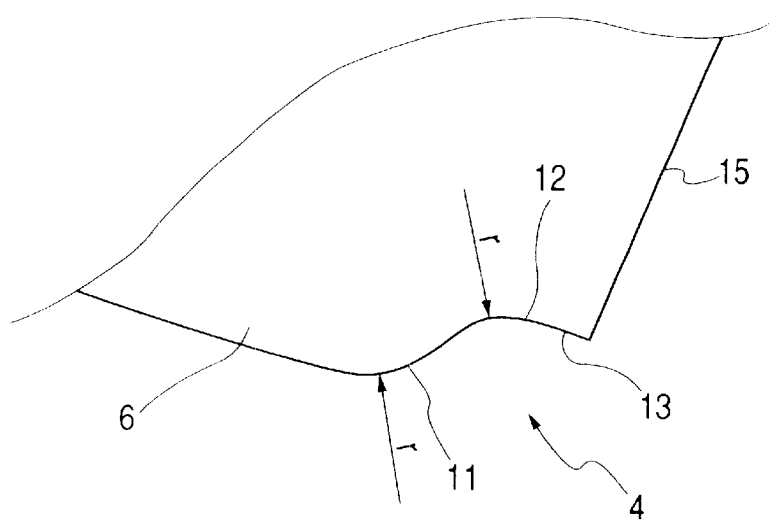
FIG. 3 is an enlarged view of the cut-away portion of the frictional material segment of FIG. 2.

Cut-away portions 4 are provided at corner portions. The corner portions are where the inner peripheral side 6 of each frictional material segment 3 and sides 14 and 15, which link the opposite ends of the sides 6 and 7 together, intersect with each other. The cut-away portions 4 are provided on the circumferentially opposite end portions of the side 6. FIG. 3 is an enlarged view of one of the cut-away portions 4. The cut-away portion 4 includes an arc 13, which is somewhat larger in radius than the radius of the side 6, and two arcs 11 and 12 having a radius r that is small as compared with the radius R of the side 6. The arcs 11, 12 and 13 are formed as a continuous curve.

Figure 4:
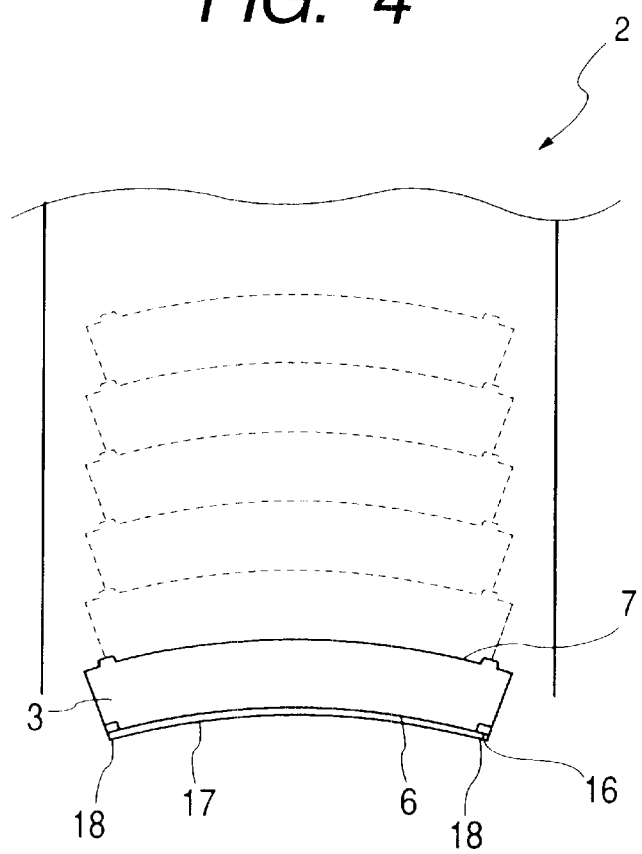
FIG. 4 is a front view showing the shape of the frictional material segments of the present invention and the state of punching by a press.
Figure 5:
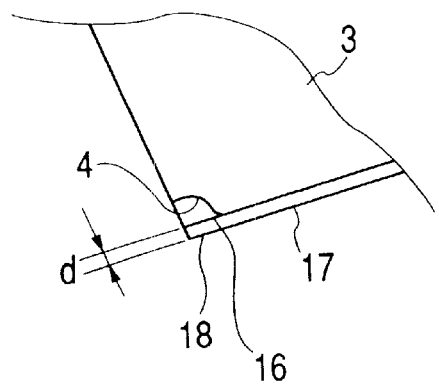
FIG. 5 is an enlarged view showing the relation between a punch and a die in FIG. 4.
Figure 6:
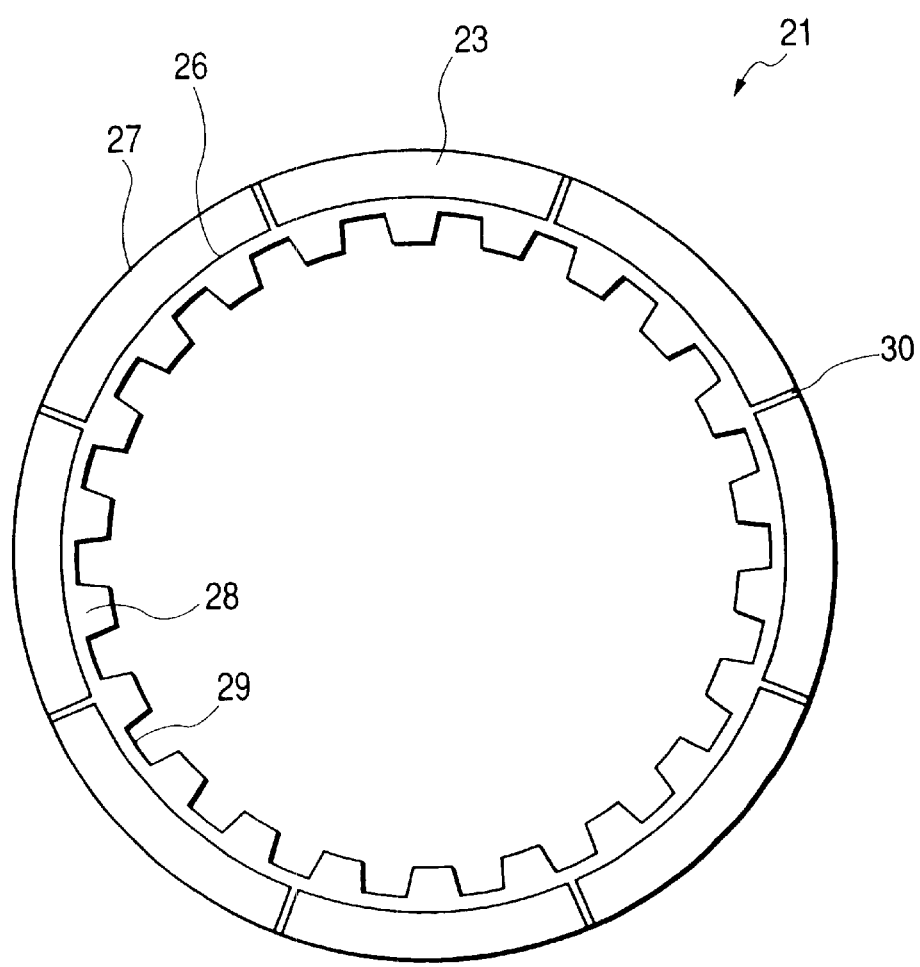
FIG. 6 is a front view showing a friction plate according to the prior art.
Figure 7:
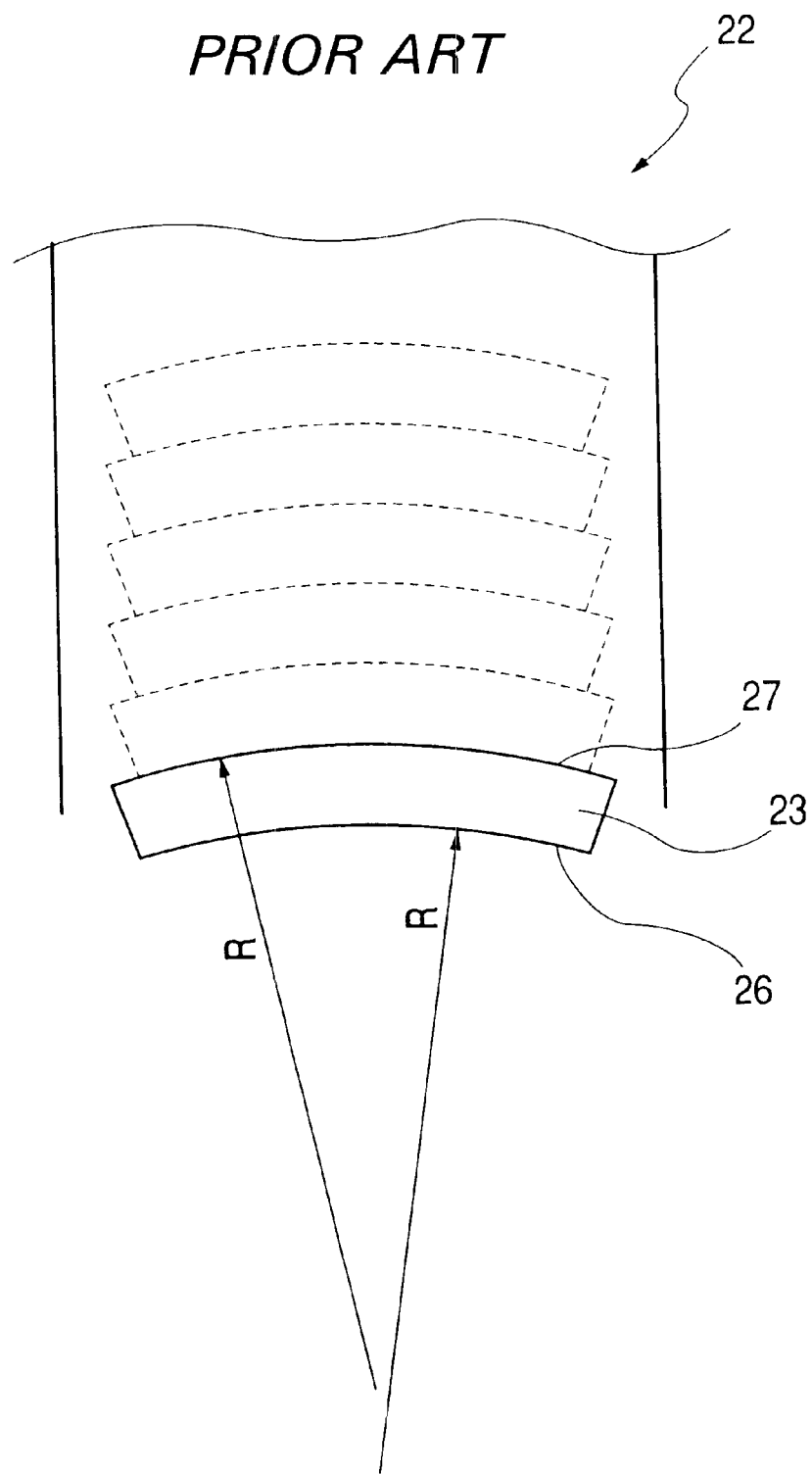
FIG. 7 shows the shape of a frictional material segment according to the prior art and the state of punching by a press.

FIG. 4 is a front view showing the shape of the frictional material segments of the present invention and the state of punching by a press, and FIG. 5 is an enlarged view showing the relation between a punch and a die in FIG. 4.

As shown in FIG. 4, the punching surface of the punch 16 of a press apparatus (not shown) for punching the frictional material segments 3 has substantially the same shape as the frictional material segments 3, but the punch 16 is slightly greater in the radial width. Also, the die 17 has at the curcumferentially opposite ends thereof corner portions 18 at which at least one of the inner and outer peripheries of the frictional material segment 3 and the sides, which link the opposite ends of the inner and outer peripheries together, intersect with each other. The corner portion 18 may be provided only at one circumferential end, but it is preferable that the corner portions 18 be provided at both ends.

As shown in detail in FIG. 5, the shapes of the die 17 and the punch 16 are the same, and protruded portions 5 which will be described later are provided on the outer periphery, but unlike the shape of the frictional material segments 3, cut-away portions corresponding to the cut-away portions 4 are absent, and only corner portions 18 are present. Also, the die 17 and the punch 16 are provided with a predetermined clearance, i.e., a gap d, between one of the inner and outer peripheries of the frictional material segment 3 and one of the inner and outer peripheries of the die, as shown, on the downstream side with respect to the feeding direction of the frictional material sheet 2.

It is better for the gap d to be small when the push-back of the frictional material segments 3 after punching toward the frictional material sheet 2 and the positioning during the supply thereof to the next step are taken into consideration. That is, it is necessary that the gap d be of such a degree that it can absorb a minute pitch error and positional deviation and still accomplish sufficient positioning. However, if an attempt is made to set the gap d with such a degree actually taken into consideration, the gap d can be set without any problem with respect to the inner periphery 6, but with respect to the corner portions 18, a great force is locally applied and therefore the force during punching cannot be sufficiently relieved. So, if the cut-away portions 4 of this invention are provided, the force during punching can be relieved. Thus, from the necessity of providing the gap d, the clearance with respect to the side located on the downstream side with respect to the feeding direction is set more greatly than the clearance with respect to the side located on the upstream side with respect to the feeding direction.

The protruded portions 5 formed on the opposite ends of the arcuate side 7 are created by providing the cut-away portions 4, and have curved surfaces complementary to the shape of the curve of the cut-away portions 4, but the protruded portions 5 themselves do not bring about an effect peculiar thereto.

Also, in the present embodiment, the cut-away portions 4 are provided at the opposite ends of the side 6 on the inner peripheral side, but can also be provided on the opposite ends of the side 7 on the outer peripheral side. In that case, the protruded portions 5 are of course formed on the side 6. Also, the cut-away portion 4 can be provided only at one end instead of the opposite ends of the side 6 or 7, but it is preferable from the viewpoint of preventing the cutting refuse during the embossing of the frictional material segments 3 by the press that the cut-away portions 4 be provided at the opposite ends.

Figure 8:
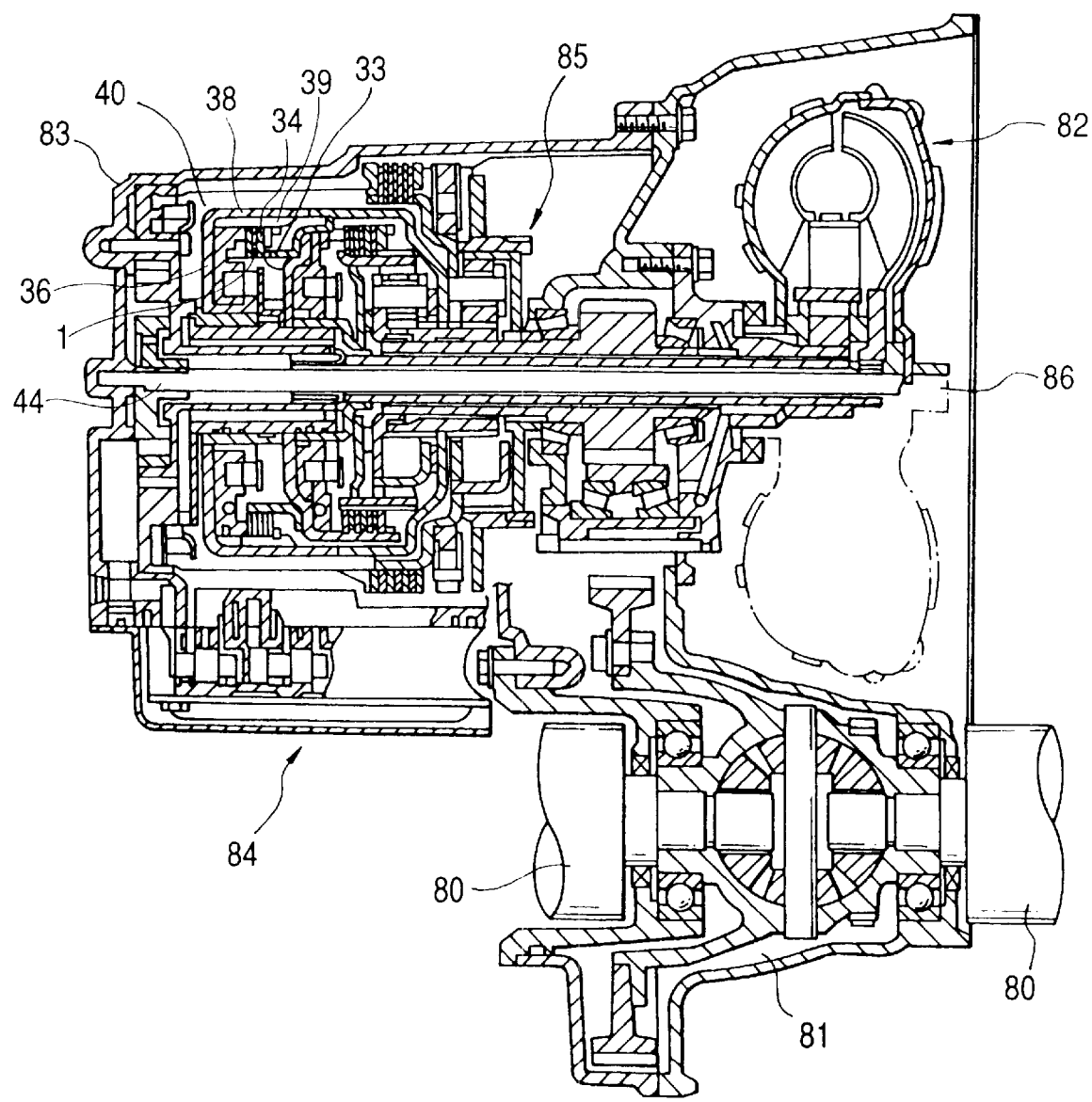
FIG. 8 is a cross-sectional view of an automatic transmission for a front wheel drive vehicle incorporating therein a friction engagement apparatus using the friction plate according to the present invention.

FIG. 8 is a cross-sectional view of an automatic transmission for a front wheel drive vehicle (FF vehicle) incorporating therein a friction engagement apparatus using the friction plate according to the present invention. The multi-plate type friction engagement apparatus 40 has a plurality of friction plates 1 and a separator plate 34. The transmission comprises a clutch drum rotatably supported on a shaft cylinder portion 64 fixed to a transmission case 83, and a clutch hub 33 fixed to another clutch drum, not shown, and the clutch drum in turn has an outer drum 38 and an inner drum 39 incorporated in the inner peripheral surface of the outer drum 38 by spot welding. The inner drum 39 is fixed to the outer drum 38 by spot welding. For example, frictional plates 21 as clutch plates having frictional material segments stuck on the core plate made of steel is supported on the outer periphery of the clutch hub 33. Also, the separator plate 34 disposed between the friction plates 1 and movable toward and away from the friction plates 1 by the operation of a piston 36 is supported on the inner drum 39 of the clutch drum. The surfaces of the friction plates 1 on which the friction material is stuck and the surfaces of the separator plate 34 which is a steel plate are alternately mounted so as to face each other.

The motive power from an engine is transmitted to is each stage of the transmission through a torque converter 82 and an input shaft 86. The clutch drum is disposed in the transmission case 83. Gears are appropriately selected by a planatly gear mechanism 85, and at that time, the connection and disconnection with a driving system are effected by the multi-plate friction engagement apparatus, i.e., a multi-plate clutch. A control value mechanism 84 is provided in the lower portion of the transmission case 83. The motive power from the transmission is transmitted to wheels, not shown, through a differential gear mechanism 81 and an output shaft 80.

FIG. 8 shows but an example of the use of the friction plate of the present invention, and the friction plate of the present invention is not restricted to use in the above-described apparatus, but can also be used in other apparatuses.

The present invention described above achieves the following effects.

According to the present invention, the creation of powder-like cutting refuse among the frictional material segments caused by the minute error of the pitch when the frictional material sheet is punched is prevented, whereby the wear and damage of the metal mold is suppressed.

Also, by the present invention, strength is provided to the inner corner portions of the cut-away portion. Further, by the present invention, the shaping by the press is easy.

What is claimed is:

1. A friction plate comprising:
   a substantially annular core plate; and
   a frictional material segment disposed on said core plate and including inner and outer peripheries and a concave cut-away portion provided at at least one of corner portions joining sides of said frictional material segment to at least one of said inner and outer peripheries.

2. A friction plate according to claim 1, wherein said concave cut-away portion includes at least one arc.

3. A friction plate according to claim 2, wherein said arc has a radius of at least 0.2 mm.

4. A friction plate according to claim 1, wherein said concave cut-away portion is provided at a corner portion joining a side of said frictional material segment to said inner periphery.

5. A friction plate according to claim 2, wherein said concave cut-away portion is provided at a corner portion joining a side of said frictional material segment to said inner periphery.

6. A friction plate according to claim 3, wherein said concave cut-away portion is provided at a corner portion joining a side of said frictional material segment to said inner periphery.

7. A friction plate according in claim 1, wherein said concave cut-away portion includes a plurality of arcs.

8. A friction plate according to claim 7, wherein at least two of said plurality of arcs have substantially equal radii of curvature.

9. A friction plate according to claim 7, wherein at least two of said plurality or arcs have dissimilar radii of curvature.

10. A friction plate according to claim 7, wherein said plurality of arcs includes three arcs in series that form a continuous curve.

11. A friction plate according to claim 7, wherein said plurality of arcs includes two arcs in series that form generally an S-shape.

12. A friction plate according to claim 1, wherein said inner and outer peripheries are arcuate with substantially equal radii of curvature.

13. A punching apparatus comprising a punch and a die constructed for punching a frictional material segment from a frictional material, wherein said frictional material segment includes inner and outer peripheries and a concave cut-away portion provided at at least one of corner portions joining sides of said frictional material segment to at least one of said inner and outer peripheries.

14. A punching apparatus according to claim 13, wherein said concave cut-away portion includes at least one arc.

15. A punching apparatus according to claim 14, wherein said arc has a radius of at least 0.2 mm.

16. A punching apparatus according to claim 15, wherein said concave cut-away portion is provided at a corner portion joining a side of said frictional material segment to said inner periphery.

17. A punching apparatus according to claim 14, wherein said concave cut-away portion is provided at a corner portion joining a side of said frictional material segment to said inner periphery.

18. A punching apparatus according to claim 13, wherein said concave cut-away portion is provided at a corner portion joining a side of said frictional material segment to said inner periphery.

19. A punching apparatus according to claim 13, wherein said concave cut-away portion includes a plurality of arcs.

20. A punching apparatus according to claim 19, wherein at least two of said plurality of arcs have substantially equal radii of curvature.

21. A punching apparatus according to claim 19, wherein at least two of said plurality or arcs have dissimilar radii of curvature.

22. A punching apparatus according to claim 19, wherein said plurality of arcs includes three arcs in series that form a continuous curve.

23. A punching apparatus according to claim 19, wherein said plurality of arcs includes two arcs forming generally an S-shape.

24. A punching apparatus according to claim 13, wherein said inner and outer peripheries are arcuate with substantially equal radii of curvature.

25. A friction engagement apparatus comprising:
    a friction plate including at least one frictional material segment and engageable with a separator plate for transmitting motive power,
    wherein said at least one frictional material segment includes inner and outer peripheries and a concave cut-away portion provided at at least one of corner portions joining sides of said frictional material segment to at least one of said inner and outer peripheries.

26. A friction engagement apparatus according to claim 25, wherein said concave cut-away portion includes at least one arc.

27. A friction engagement apparatus according to claim 26, wherein said arc has a radius of at least 0.2 mm.

28. A friction engagement apparatus according to claim 27, wherein said concave cut-away portion is provided at a corner portion joining a side of said frictional material segment to said inner periphery.

29. A friction engagement apparatus according to claim 26, wherein said concave cut-away portion is provided at a corner portion joining a side of said frictional material segment to said inner periphery.

30. A friction engagement apparatus according to claim 25, wherein said concave cut-away portion is provided at a corner portion joining a side of said frictional material segment to said inner periphery.

31. A friction engagement apparatus according to claim 25, wherein said concave cut-away portion includes a plurality of arcs.

32. A friction engagement apparatus according to claim 31, wherein at least two of said plurality of arcs have substantially equal radii of curvature.

33. A friction engagement apparatus according to claim 31, wherein at least two of said plurality of arcs have dissimilar radii of curvature.

34. A friction engagement apparatus according to claim 31, wherein said plurality of arcs includes three arcs in series that form a continuous curve.

35. A friction engagement apparatus according to claim 31, wherein said plurality of arcs includes two arcs in series that form generally an S-shape.

36. A friction engagement apparatus according to claim 25, wherein said inner and outer peripheries are arcuate with substantially equal radii of curvature.

37. A frictional material segment having:
   an inner periphery;
   an outer periphery;
   sides joined to said inner periphery and said outer periphery at corner portions; and
   a concave cut-away portion provided at at least one of said corner portions.

38. A frictional material segment according to claim 37, wherein said concave cut-away portion includes at least one arc.

39. A frictional material segment according to claim 37, wherein said concave cut-away portion is provided at a corner portion joining a side of said friction material segment to said inner periphery.

40. A frictional material segment according to claim 37, wherein said concave cut-away portion includes a plurality of arcs.

41. A friction plate according to claim 40, wherein at least two of said plurality of arcs have substantially equal radii of curvature.

42. A friction plate according to claim 40, wherein at least two of said plurality or arcs have dissimilar radii of curvature.

43. A friction plate according to claim 40, wherein said plurality of arcs includes three arcs in series that form a continuous curve.

44. A friction plate according to claim 40, wherein said plurality of arcs includes two arcs in series that form generally an S-shape.

45. A method for punching a frictional material segment having inner and outer peripheries and a concave cut-away portion provided at at least one of corner portions joining sides of said frictional material segment to at least one of said inner and outer peripheries, said method comprising punching a part of said frictional material segment including said concave cut-away portion and thereafter punching the remainder of said frictional material segment.

46. A method for punching a frictional material segment from a frictional material with a punch and a die, said method comprising punching said frictional material segment having inner and outer peripheries and a concave cut-away portion provided at at least one of corner portions joining sides of said frictional material segment to one of said inner and outer peripheries that is upstream from the other in relation to a feed direction of said frictional material.

47. A method according to claim 46, wherein a first clearance between said punch and said die at portions corresponding to said other periphery is greater than a second clearance between said punch and said die at portions corresponding to said one periphery.

48. A punching apparatus comprising a punch and a die constructed to punch a frictional material segment from a frictional material, the frictional material segment including inner and outer peripheries and a concave cut-away portion provided at at least one of corner portions joining sides of said frictional material segment to one of said inner and outer peripheries that is upstream from the other in relation to a feed direction of said frictional material.

49. An apparatus according to claim 44, wherein a first clearance between said punch and said die at portions corresponding to said other periphery is greater than a second clearance between said punch and said die at portions corresponding to said one peripher.

50. A method according to claim 45, wherein said inner and outer peripheries are arcuate with substantially equal radii of curvature.

51. A method according to claim 46, wherein said inner and outer peripheries are arcuate with substantially equal radii of curvature.

52. A method according to claim 47, wherein said inner and outer peripheries are arcuate with substantially equal radii of curvature.

53. An apparatus according to claim 48, wherein said inner and outer peripheries are arcuate with substantially equal radii of curvature.

54. An apparatus according to claim 49, wherein said inner and outer peripheries are arcuate with substantially equal radii of carvature.

* * * * *